United States Patent
Kurokochi et al.

(10) Patent No.: US 9,949,212 B2
(45) Date of Patent: Apr. 17, 2018

(54) MOBILE COMMUNICATION SYSTEM, POWER CONTROL METHOD, AND BASE STATION DEVICE OF SMALL CELL

(71) Applicant: FUJITSU LIMITED, Kawasaki-shi, Kanagawa (JP)

(72) Inventors: Fumiyasu Kurokochi, Yokohama (JP); Koji Ogawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 686 days.

(21) Appl. No.: 14/474,472

(22) Filed: Sep. 2, 2014

(65) Prior Publication Data

US 2014/0370930 A1    Dec. 18, 2014

Related U.S. Application Data

(63) Continuation of application No. PCT/JP2012/056982, filed on Mar. 19, 2012.

(51) Int. Cl.
*H04W 52/26* (2009.01)
*H04W 16/32* (2009.01)
(Continued)

(52) U.S. Cl.
CPC ......... *H04W 52/265* (2013.01); *H04W 16/18* (2013.01); *H04W 16/32* (2013.01);
(Continued)

(58) Field of Classification Search
USPC ........................................................ 455/522
See application file for complete search history.

(56) References Cited

U.S. PATENT DOCUMENTS 8,620,374 B2 * 12/2013 Nakamura ........ H04W 52/0274
455/522
2011/0076964 A1    3/2011 Dottling et al.
(Continued)

FOREIGN PATENT DOCUMENTS

JP    2009-278450    11/2009
JP    2010-245782    10/2010
(Continued)

OTHER PUBLICATIONS

JPOA—Office Action dated Jun. 23, 2015 issued with respect to the corresponding Japanese Patent Application No. 2014-505825, with partial English translation.
(Continued)

*Primary Examiner* — Ankur Jain
(74) *Attorney, Agent, or Firm* — Fujitsu Patent Center

(57) ABSTRACT

A mobile communication system of an overlay configuration includes small cells that are arranged in a macro cell, in which a base station of each small cell executes shifting to a standby state in which transmission power is turned off when a mobile terminal is not in the small cell, and measuring a quality of radio waves received from the mobile terminal that is present in the macro cell, and reporting a measurement result to a base station control device, and the base station control device executes selecting one of the small cells in which the mobile terminal is to be contained, based on the measurement results reported from the base stations of the small cells, and instructing the base station of the selected small cell to shift to a communication state in which the transmission power is turned on.

11 Claims, 15 Drawing Sheets

(51) Int. Cl.
*H04W 84/10* (2009.01)
*H04W 88/08* (2009.01)
*H04W 52/02* (2009.01)
*H04W 16/18* (2009.01)
*H04W 52/24* (2009.01)

(52) U.S. Cl.
CPC ..... *H04W 52/0206* (2013.01); *H04W 52/244* (2013.01); *H04W 84/10* (2013.01); *H04W 88/08* (2013.01); *Y02D 70/00* (2018.01); *Y02D 70/1262* (2018.01); *Y02D 70/164* (2018.01)

(56) References Cited

U.S. PATENT DOCUMENTS

| | | | |
|---|---|---|---|
| 2011/0077029 A1 | 3/2011 | Okuda | |
| 2011/0207468 A1 | 8/2011 | Nakamura et al. | |
| 2012/0149374 A1 | 6/2012 | Morita et al. | |
| 2012/0264477 A1* | 10/2012 | Araragi | H04W 52/0235 455/517 |

FOREIGN PATENT DOCUMENTS

| | | |
|---|---|---|
| JP | 2011-091748 | 5/2011 |
| JP | 2011-130260 | 6/2011 |
| WO | 2010050320 | 5/2010 |
| WO | 2010/151184 A1 | 12/2010 |
| WO | 2011/024415 A1 | 3/2011 |
| WO | 2011/074673 A1 | 6/2011 |

OTHER PUBLICATIONS

EPOA—European Office Action dated Jul. 7, 2016 issued with respect to the corresponding European Patent Application No. 12872066.1.
EESR—Extended European Search Report dated Mar. 24, 2015 issued with respect to the corresponding European Patent Application No. 12872066.1.
EPOA—European Office Action dated Dec. 22, 2015 issued with respect to the corresponding European Patent Application No. 12872066.1.
International Search Report of Int. Appl. No. PCT/JP2012/056982 dated Jun. 5, 2012.
CNOA—First Notification of Office Action dated Jul. 19, 2017 issued with respect to the corresponding Chinese Patent Application No. 201280071142.6, with full translated office action. References cited in the CNOA were previously submitted in the IDS dated Apr. 20, 2015.
EPOA—Office Action dated Jan. 12, 2018 issued with respect to the corresponding European Patent Application No. 12872066.1.
CNOA—Office Action dated Feb. 2, 2018 issued with respect to the corresponding Chinese Patent Application No. 201280071142.6, with English translation.

* cited by examiner

MOBILE COMMUNICATION SYSTEM, POWER CONTROL METHOD, AND BASE STATION DEVICE OF SMALL CELL

CROSS-REFERENCE TO RELATED APPLICATION

This application is a U.S. continuation application filed under 35 USC 111(a) claiming benefit under 35 USC 120 and 365(c) of PCT Application PCT/JP2012/056982 filed on Mar. 19, 2012, the entire contents of which are incorporated herein by reference.

FIELD

The present invention is related to a mobile communication system, a power control method, and a base station device of a small cell.

BACKGROUND

When constituting a cell forming a communication area in a mobile communication network, even when a mobile terminal is not present in the cell, the base station continuously sends out radio waves to indicate the presence of the cell to the mobile terminal. For this reason, even in a non-communication state, power is constantly consumed.

For this reason, there has been conventionally proposed an overlay configuration, in which a plurality of small cells are arranged in a macro cell. When a small cell is not communicating, the power consumption of the small cell is reduced to so that power is saved, and the number of small cells is increased so that power is saved while maintaining the traffic capacity.

In this case, a macro cell is provided for indicating the presence of the area to the mobile terminal. For activating each of the small cells, position information is used, which may be obtained by GPS (Global Positioning System) of the mobile terminal. The position information of the cover area of each small cell is compared with the position information of the mobile terminal, and a small cell having a cover area including the position of the mobile terminal, is determined to be the small cell to be activated.

Incidentally, a second base station device, which performs communication processes for wireless signals for a second cell that is arranged redundantly in a first cell, stops receiving at least some of the power, in response to the disappearance of traffic in the second cell. A first base station device corresponding to a first cell, which has received a connection request from a mobile terminal device present in the first cell, identifies a second base station device capable of processing communications for the mobile terminal device. The first base station device selectively resumes the receiving of power for the identified second base station device. The above technology has been proposed (see, for example, Patent Document 1).

Furthermore, there is proposed an upper-layer base station including an upper-layer wireless unit that implements communications with a wireless terminal present in an upper-layer cell; an inter-upper-layer base station communication unit that implements communications with a lower-layer base station forming a lower-layer cell; and an upper-layer control unit that gives an instruction to a lower-layer base station that satisfies a communication connection condition with respect to a wireless terminal with which communication is presently performed, to switch from a power saving mode to a regular operation mode, via the inter-upper-layer base station communication unit (see, for example, Patent Document 2).

Patent Document 1: Japanese Laid-Open Patent Publication No. 2011-91748
Patent Document 2: Japanese Laid-Open Patent Publication No. 2011-130260

In the conventional technology, for activating a small cell, the position information of the mobile terminal and the position information of the cover area of the small cell are used, and therefore the following problem arises. An optimum communication quality is not necessarily secured only by the relationship between the position of the mobile terminal and the position of the small cell. For example, even when the position of the mobile terminal is in the cover area of the small cell, there are cases where communication is not possible due to building shadows. Therefore, there may be cases where communication is not possible at the stage of actually attempting to perform communication. Furthermore, in order to associate the position of the mobile terminal with the cover area of the small cell, a database of position information needs to be constructed, which leads to an increase in cost.

SUMMARY

A mobile communication system according to a disclosed embodiment is of an overlay configuration in which a plurality of small cells are arranged in a macro cell, wherein a base station of each of the plurality of small cells includes a transition unit configured to shift to a standby state in which transmission power is turned off when a mobile terminal is not contained in a corresponding one of the plurality of small cells, and a report unit configured to measure a quality of radio waves received from the mobile terminal that is present in the macro cell, and report a measurement result to a base station control device, wherein the base station control device includes a selection unit configured to select one of the plurality of small cells in which the mobile terminal is to be contained, based on the measurement results reported from the base stations of the plurality of small cells, and an instruction unit configured to instruct the base station of the selected one of the plurality of small cells to shift to a communication state in which the transmission power is turned on.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

In the following, embodiments are described with reference to drawings.

<Mobile Communication System>

Figure 1:
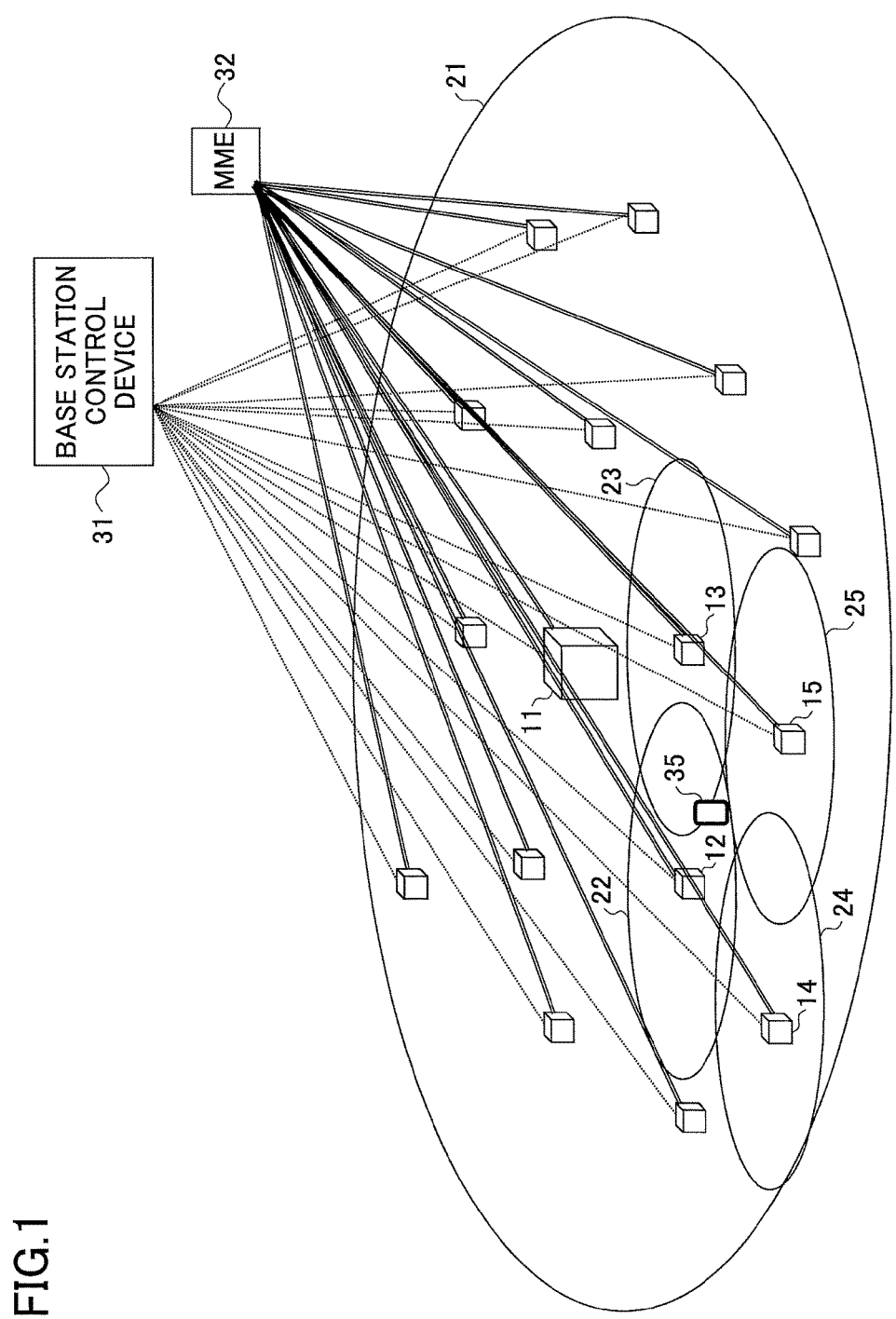
FIG. 1 is a configuration diagram of an embodiment of a mobile communication system.

FIG. 1 is a configuration diagram of an embodiment of a mobile communication system. In FIG. 1, a macro cell base station 11 forms a macro cell indicated by a cover area 21. In the cover area 21 of this macro cell, small cell base stations 12, 13, 14, 15, etc., are arranged. Each of the small cell base stations 12, 13, 14, 15, etc., forms a small cell indicated by cover areas 22, 23, 24, 25, etc., respectively. That is to say, this is an overlay configuration in which the cover area 21 of the macro cell and the cover areas 22, 23, 24, 25, etc., of the small cells are superposed.

A base station control device 31 controls the macro cell base station 11 and all of the small cell base stations 12, 13, 14, 15, etc., in the cover area 21. The base station control device 31, the macro cell base station 11, and all of the small cell base stations 12, 13, 14, 15, etc., in the cover area 21 are connected by a network. Note that the base station control device 31 may be arranged in, for example, the macro cell base station 11, or may be arranged in a management device of a mobile communication system such as an EMS (Element Management System) managing the state of the base station.

All of the small cell base stations 12, 13, 14, 15, etc., in the cover area 21 measure the quality of reception radio waves from a mobile terminal 35, etc., at the same timing. The measurement timing is determined by a method of synchronization by an instruction from the base station control device 31, or a method of determining the timing in advance at the small cell base stations 12, 13, 14, 15, etc.

Figure 2:
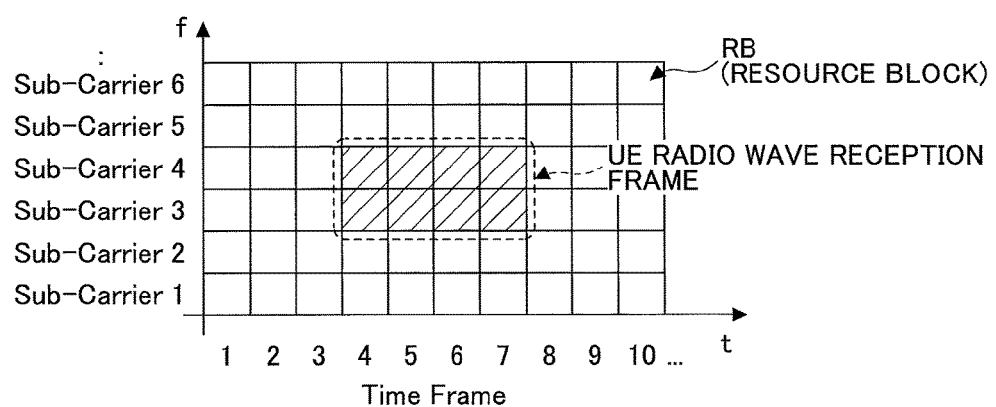
FIG. 2 illustrates an uplink wireless resource.

FIG. 2 illustrates an uplink wireless resource in LTE (Long Term Evolution). Blocks, which are divided by continuous sub-carriers in the transmission band and OFDM symbols, are referred to as resource blocks (RB). In FIG. 2, the fourth through seventh frames in the third and fourth sub-carriers are set as the timings for measuring the quality of reception radio waves of the small cell base stations 12, 13, 14, 15, etc.

<First Embodiment of Mobile Communication System>

Figure 3:
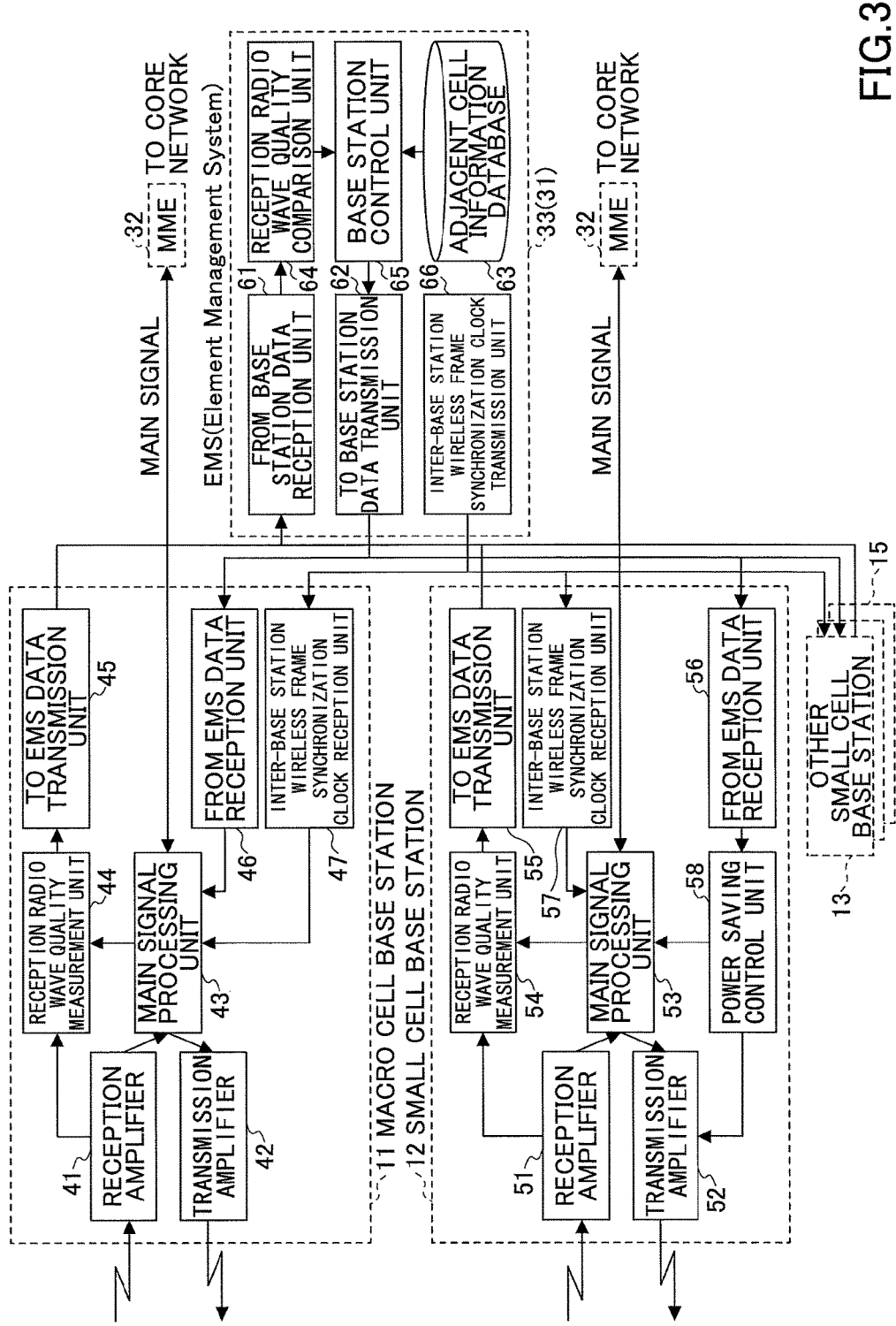
FIG. 3 is a configuration diagram of a first embodiment of a mobile communication system.

FIG. 3 is a configuration diagram of a first embodiment of a mobile communication system in which the base station control device 31 is arranged in an EMS 33.

In the macro cell base station 11, a reception amplifier 41 receives radio waves from the mobile terminal 35 and amplifies the radio waves. A transmission amplifier 42 sends radio waves to the mobile terminal 35. A main signal processing unit 43 performs main signal processing, such as processing signals that are transmitted/received between the macro cell base station 11 and the mobile terminal 35, and processing signals that are transmitted/received between the macro cell base station 11 and a MME (Mobile Management Entity) 32 of the core network. A reception radio wave quality measurement unit 44 measures the quality of the reception radio waves based on reception radio waves and reception signals from the mobile terminal 35. In this case, for example, the reception radio wave intensity of a measurement radio wave, i.e., a specific message for measurement, or the average power of the specific message for measurement (equivalent to RSRP: Reference Signal Received Power), or a reception quality expressed by the ratio of the average power of the specific message for measurement and the reception intensity of signals of the entire small cell including external noise (equivalent to RSRQ: Reference Signal Received Quality), is set as the quality of the reception radio waves.

A to EMS data transmission unit 45 sends data such as reception radio wave quality measurement results from the reception radio wave quality measurement unit 44, to the EMS 33. A from EMS data reception unit 46 receives data from the EMS 33 and supplies the data to a main signal processing unit 43, etc. An inter-base station wireless frame synchronization clock reception unit 47 receives wireless frame synchronization clocks for synchronizing, between the base stations, the reception radio wave quality measurement timings of the wireless reception frames of the mobile terminal 35 illustrated in FIG. 2, and supplies the clocks from the main signal processing unit 43 to the reception radio wave quality measurement unit 44.

In the small cell base station 12, a reception amplifier 51 receives radio waves from the mobile terminal 35 and amplifies the radio waves. A transmission amplifier 52 sends radio waves to the mobile terminal 35. A main signal processing unit 53 performs main signal processing, such as processing signals that are transmitted/received between the small cell base station 12 and the mobile terminal 35 and processing signals that are transmitted/received between the small cell base station 12 and the MME 32 of the core network.

A reception radio wave quality measurement unit 54 measures the quality of the various reception radio waves based on reception radio waves and reception signals from the mobile terminal 35. In this case, for example, the reception radio wave intensity of a measurement radio wave, i.e., a specific message for measurement, or the average power of the specific message for measurement, or a reception quality expressed by the ratio of the average power of the specific message for measurement and the reception intensity of signals of the entire small cell including external noise, is set as the quality of the reception radio waves.

A to EMS data transmission unit 55 sends data such as reception radio wave quality measurement results from the reception radio wave quality measurement unit 54, to the EMS 33. A from EMS data reception unit 56 receives control data from the EMS 33 and supplies the data to a power saving control unit 58, etc. An inter-base station wireless frame synchronization clock reception unit 57 receives clocks for synchronizing, between the base stations, the reception radio wave quality measurement timings of the wireless reception frames of the mobile terminal 35 illustrated in FIG. 2, and supplies the clocks from the main signal processing unit 53 to the reception radio wave quality measurement unit 54, etc. The power saving control unit 58 receives an instruction (control data) from a base station control unit 65 in the base station control device 31, and controls the power saving operations of the transmission amplifier 52, etc., of the station itself. The small cell base stations 13, 14, 15, etc., have the same configuration as the small cell base station 12.

In the base station control device 31 in the EMS 33, a from base station data reception unit 61 receives data from the macro cell base station 11 and the small cell base stations 12, 13, 14, 15, etc. A to base station data transmission unit 62 sends data to each of the macro cell base station 11 and the small cell base stations 12, 13, 14, 15, etc. An adjacent cell information database 63 saves the positional relationships and the adjacent relationships of cover areas 22, 23, 24, 25, etc., of the small cells in the cover area 21 of the macro cell base station 11, and also holds the information of a plurality of small cells adjacent to the small cell that is the control target, as adjacent cell information.

A reception radio wave quality comparison unit 64 compares the reception radio wave quality measurement results of the mobile terminal 35 sent from each of the small cell base stations 12, 13, 14, 15, etc., and determines the small cell with which the mobile terminal 35 is to communicate, i.e., the small cell base station to be activated. In this case, for example, a small cell base station having the maximum reception radio wave intensity of the specific message for measurement, or the maximum average power of the specific message for measurement, or the maximum ratio between the average power of the specific message for measurement and the reception intensity of the signals of the entire small cell including external noise, is determined to be the small cell base station to be activated. The base station control unit 65 performs activation control on the target small cell base station, based on the information indicating the small cell base station to be activated reported from the reception radio wave quality comparison unit 64.

An inter-base station wireless frame synchronization clock transmission unit 66 sends master clocks for synchronizing the wireless frames between the base stations to the small cell base stations 12, 13, 14, 15, etc.

<Second Embodiment of Mobile Communication System>

Figure 4:
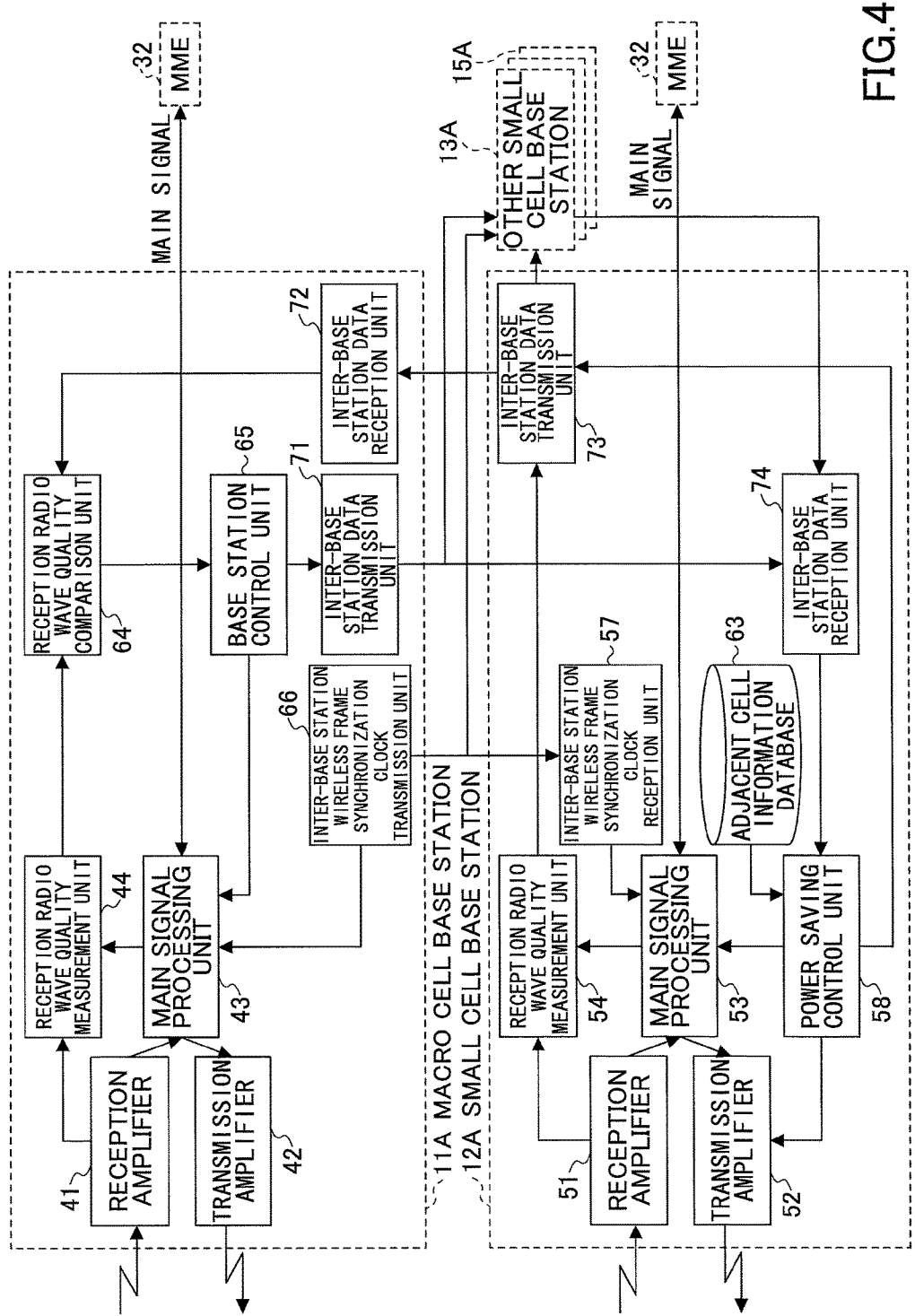
FIG. 4 is a configuration diagram of a second embodiment of a mobile communication system.

FIG. 4 is a configuration diagram of a second embodiment of a mobile communication system in which a base station control unit is arranged in a macro cell base station. A macro cell base station 11A and small cell base stations 12A through 15A illustrated in FIG. 4 correspond to the macro cell base station 11 and the small cell base stations 12 through 15 illustrated in FIG. 2, and in FIG. 4, the same elements as those of FIG. 3 are denoted by the same reference numerals.

In the macro cell base station 11A illustrated in FIG. 4, a reception amplifier 41 receives radio waves from the mobile terminal 35 and amplifies the radio waves. A transmission amplifier 42 sends radio waves to the mobile terminal 35. A main signal processing unit 43 performs main signal processing, such as processing signals that are transmitted/received between the macro cell base station 11A and the mobile terminal 35 and processing signals that are transmitted/received between the macro cell base station 11A and the MME 32 of the core network.

A reception radio wave quality measurement unit 44 measures the quality of the various reception radio waves based on reception radio waves and reception signals from the mobile terminal 35. In this case, for example, the reception radio wave intensity of a measurement radio wave, i.e., a specific message for measurement, or the average power of the specific message for measurement, or a reception quality expressed by the ratio of the average power of the specific message for measurement and the reception intensity of signals of the entire small cell including external noise, is set as the quality of the reception radio waves.

A reception radio wave quality comparison unit 64 compares the reception radio wave quality measurement results of the mobile terminal 35 sent from each of the small cell base stations 12A, 13A, 14A, 15A, etc., and determines the small cell with which the mobile terminal 35 is to communicate, i.e., the small cell base station to be activated. In this case, for example, a small cell base station having the maximum reception radio wave intensity of the specific message for measurement, or the maximum average power of the specific message for measurement, or the maximum ratio between the average power of the specific message for measurement and the reception intensity of the signals of the entire small cell including external noise, is determined to be the small cell base station to be activated. The base station control unit 65 performs activation control on the target small cell base station, based on the information indicating the small cell base station to be activated reported from the reception radio wave quality comparison unit 64.

An inter-base station wireless frame synchronization clock transmission unit 66 sends master clocks for synchronizing the wireless frames between the base stations to the small cell base stations 12A, 13A, 14A, 15A, etc.

An inter-base station data transmission unit 71 sends data to each of the small cell base stations 12A, 13A, 14A, 15A, etc., according to control from the base station control unit 65. An inter-base station data reception unit 72 receives data from the small cell base stations 12A, 13A, 14A, 15A, etc., and supplies the data to the reception radio wave quality comparison unit 64.

In the small cell base station 12A, a reception amplifier 51 receives radio waves from the mobile terminal 35 and amplifies the radio waves. A transmission amplifier 52 sends radio waves to the mobile terminal 35. A main signal processing unit 53 performs main signal processing, such as processing signals that are transmitted/received between the small cell base station 12A and the mobile terminal 35 and processing signals that are transmitted/received between the small cell base station 12A and the MME 32 of the core network. A reception radio wave quality measurement unit 54 measures the quality of the various reception radio waves based on reception radio waves and reception signals from the mobile terminal 35.

An inter-base station wireless frame synchronization clock reception unit 57 receives clocks for synchronizing, between the base stations, the reception radio wave quality measurement timings of the wireless reception frames of the mobile terminal 35 illustrated in FIG. 2, and supplies the clocks from the main signal processing unit 53 to the reception radio wave quality measurement unit 54, etc. The power saving control unit 58 receives an instruction from a base station control unit 65 in the macro cell base station 11A, and controls the power saving operations of the base station.

An adjacent cell information database 63 saves the positional relationships and the adjacent relationships of cover areas 22, 23, 24, 25, etc., of the small cells in the cover area 21 of the macro cell base station 11A, and also holds the information of a plurality of small cells adjacent to the small cell that is the control target, as adjacent cell information. The adjacent cell information is supplied to the power saving control unit 58. Note that instead of providing the adjacent cell information database 63 in the small cell base stations 12A, 13A, 14A, 15A, etc., the adjacent cell information database 63 may be provided in the macro cell base station 11A.

An inter-base station data transmission unit 73 sends data of the reception radio wave measurement result to the macro cell base station 11A, and sends the data of power saving control to other small cell base stations 13A, 14A, 15A, etc. An inter-base station data reception unit 74 receives control data from the macro cell base station 11A and supplies the control data to the power saving control unit 58, and receives data of power saving control from the other small cell base stations 13A, 14A, 15A, etc. The small cell base stations 13A, 14A, 15A, etc., have the same configuration as the small cell base station 12A.

<Hardware Configuration of Small Cell Base Station>

Figure 5:
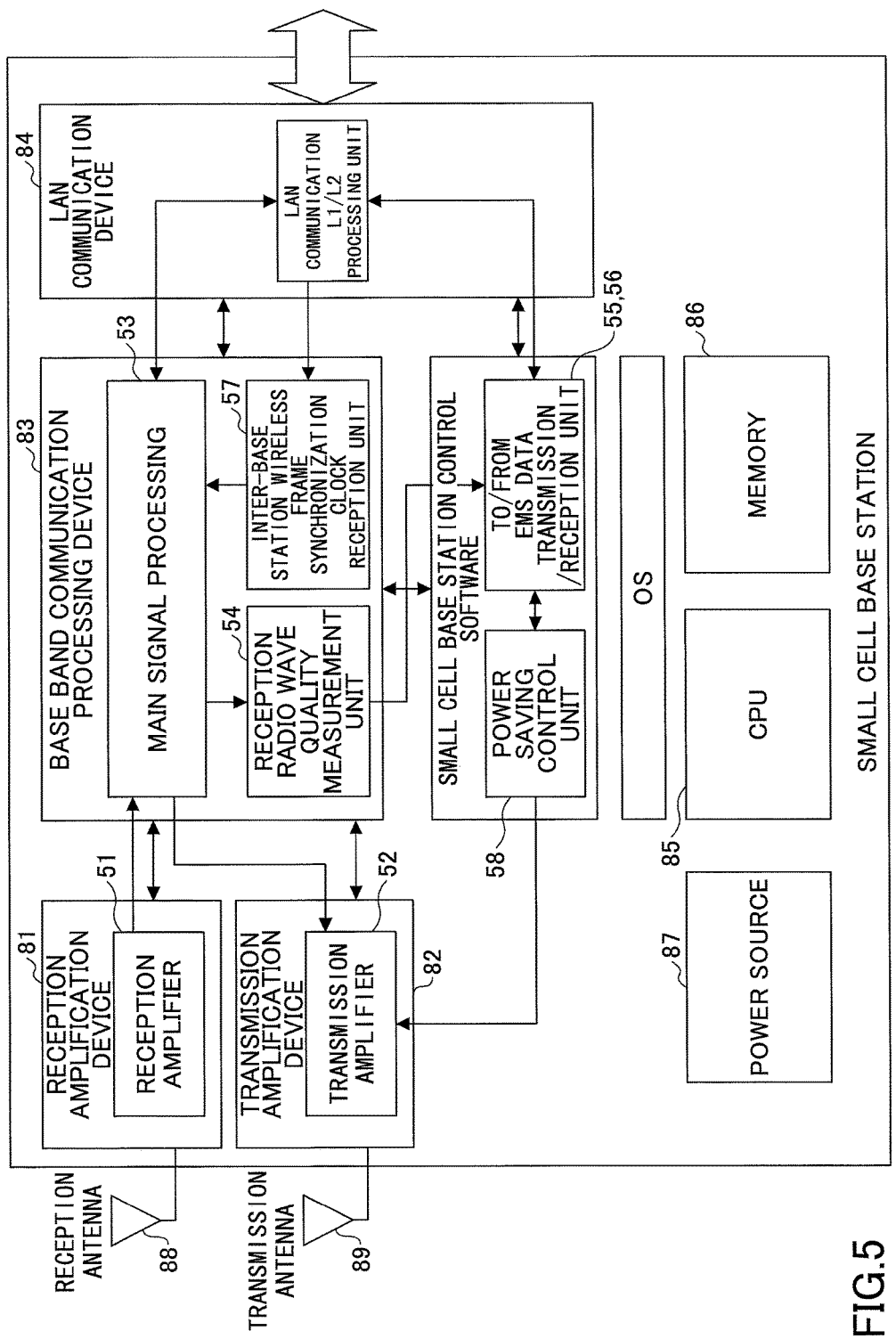
FIG. 5 is a hardware configuration diagram of one embodiment of a small cell base station 12.

FIG. 5 is a hardware configuration diagram of one embodiment of the small cell base station 12. The small cell base station 12 includes a reception amplification device 81, a transmission amplification device 82, a base band communication processing device 83, a LAN communication device 84, a CPU 85, a memory 86, a power source device 87, a reception antenna 88, and a transmission antenna 89.

The reception amplifier 51 is mounted on the reception amplification device 81, and the transmission amplifier 52 is mounted on the transmission amplification device 82. The main signal processing unit 53, the reception radio wave quality measurement unit 54, and the inter-base station wireless frame synchronization clock reception unit 57 are mounted on the base band communication processing device 83. The LAN communication device 84 performs the processes of layer 1 and layer 2 in LAN (Local Area Network) communication.

The CPU 85 executes an OS (Operating System) and programs of small cell base station control software stored in the memory 86, to implement the functions of the to EMS data transmission unit 55, the from EMS data reception unit 56, the power saving control unit 58, etc.

Figure 6:
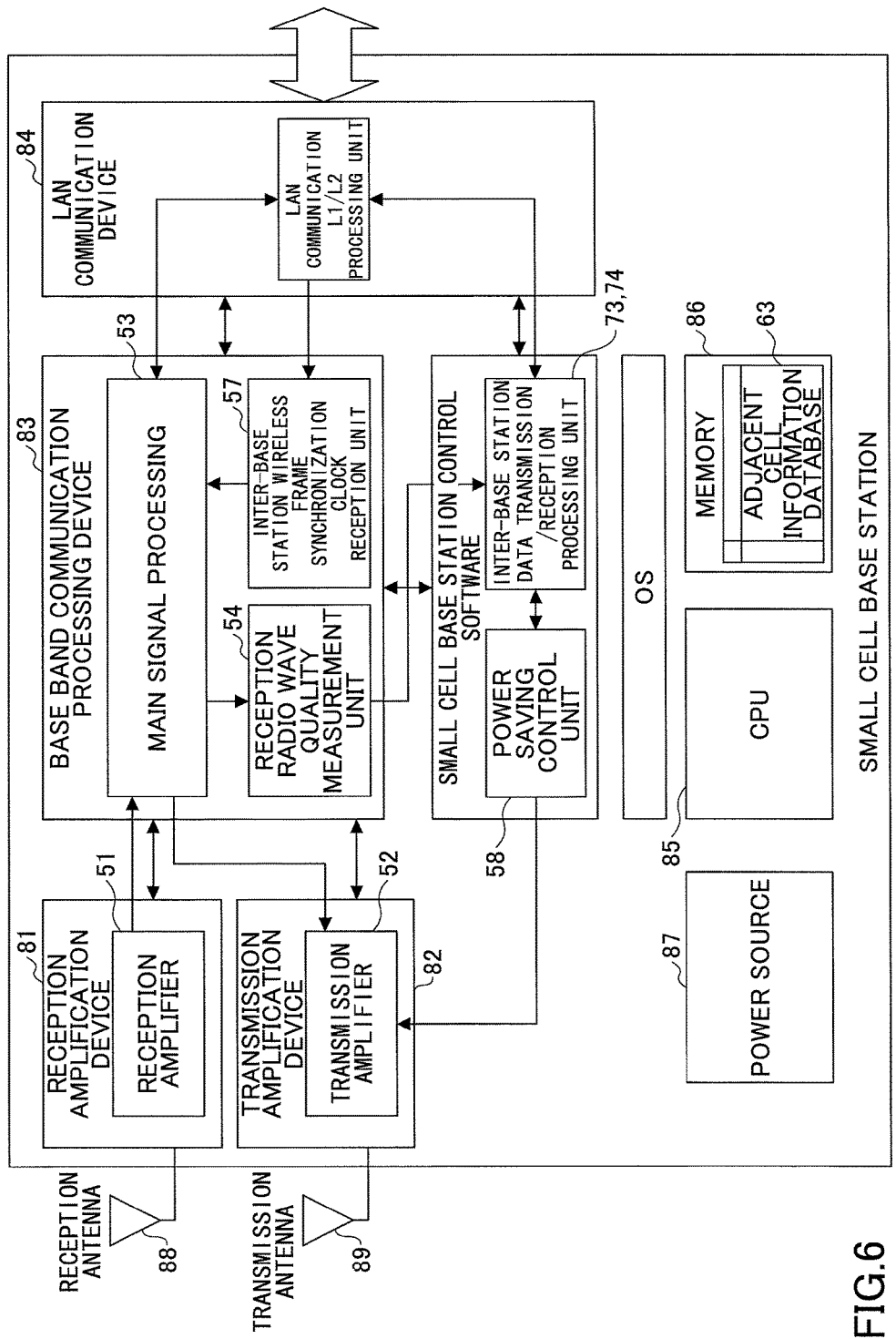
FIG. 6 is a hardware configuration diagram of one embodiment of a small cell base station 12A.

FIG. 6 is a hardware configuration diagram of one embodiment of the small cell base station 12A. In FIG. 6, the same elements as those of FIG. 5 are denoted by the same reference numerals. The small cell base station 12A includes a reception amplification device 81, a transmission amplification device 82, a base band communication processing device 83, a LAN communication device 84, a CPU 85, a memory 86, a power source device 87, a reception antenna 88, and a transmission antenna 89.

The reception amplifier 51 is mounted on the reception amplification device 81, and the transmission amplifier 52 is mounted on the transmission amplification device 82. The main signal processing unit 53, the reception radio wave quality measurement unit 54, and the inter-base station wireless frame synchronization clock reception unit 57 are mounted on the base band communication processing device 83. The LAN communication device 84 performs the processes of layer 1 and layer 2 in LAN communication.

The CPU 85 executes an OS and programs of small cell base station control software stored in the memory 86, to implement the functions of the power saving control unit 58, the inter-base station data transmission unit 73, the inter-base station data reception unit 74, etc. Furthermore, the adjacent cell information database 63 is stored in the memory 86.

Note that the hardware configuration of the macro cell base station 11, 11A also includes a reception amplifier device, a transmission amplifier device, a base band communication processing device, a LAN communication device, a CPU, a memory, a power source device, a transmission antenna, and a reception antenna, similar to FIGS. 5 and 6.

<Standby State>

Figure 7:
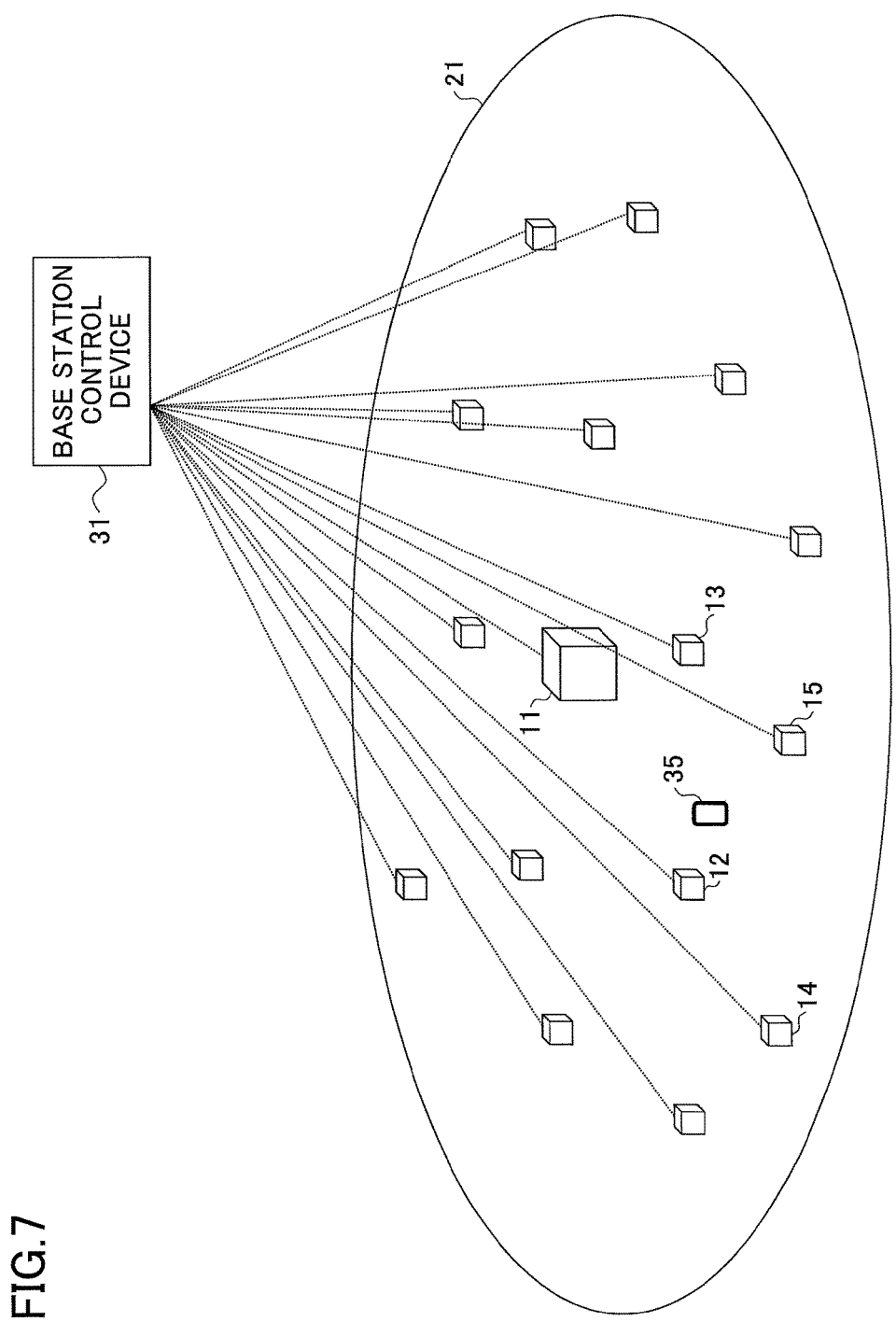
FIG. 7 is a diagram for describing a standby state.

FIG. 7 is a diagram for describing a standby state. In FIG. 7, the macro cell base station 11 constantly sends out radio waves, for indicating that the cover area 21 of the macro cell base station 11 is an area where communication is possible, to the mobile terminal 35 present in the cover area 21. As the same time, the macro cell base station 11 receives a position registration request of the mobile terminal 35 that has entered the cover area 21, and prepares for paging with respect to the mobile terminal 35 in the cover area 21. That is to say, in a standby state, regular operations of the macro cell base station 11 are performed. In the standby state, the small cell base stations 12, 13, 14, 15, etc., stop sending radio waves.

<Call Request Operation from Mobile Terminal (1)>

Figure 8:
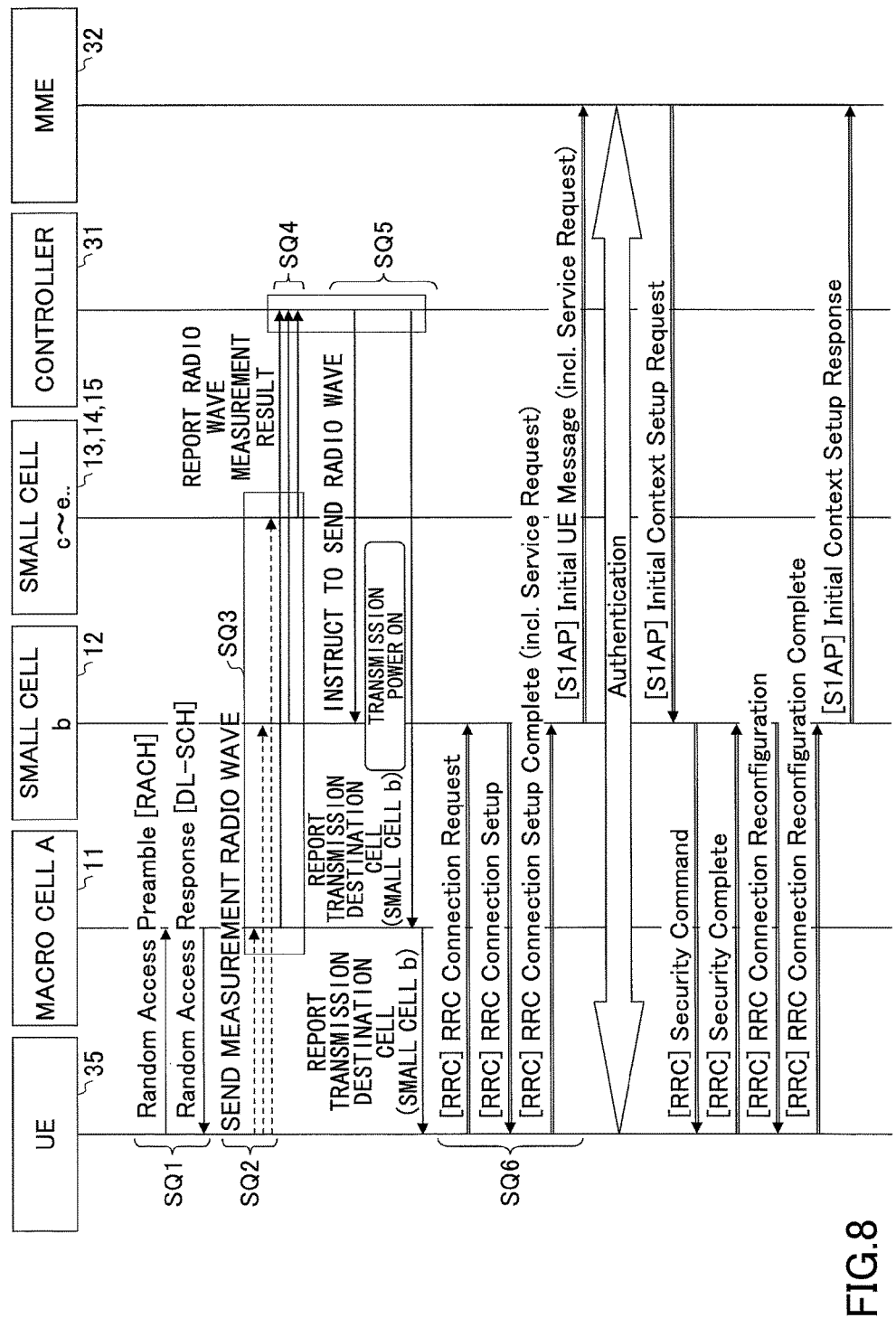
FIG. 8 illustrates the procedures of an embodiment of establishing communication when a call request is made from a mobile terminal.

FIG. 8 illustrates the procedures of an embodiment of establishing communication when a call request is made from a mobile terminal. In this case, a description is given of an example of a sequence of LTE.

In a standby state as illustrated in FIG. 7, the mobile terminal (UE: User Equipment) 35 accesses the macro cell base station 11 in a regular manner by RACH (Random Access Channel). In a state where communication is possible, the macro cell base station 11 responds to the mobile terminal 35 by DL-SCH (Downlink-Shared Channel) (sequence SQ1).

Figure 9:
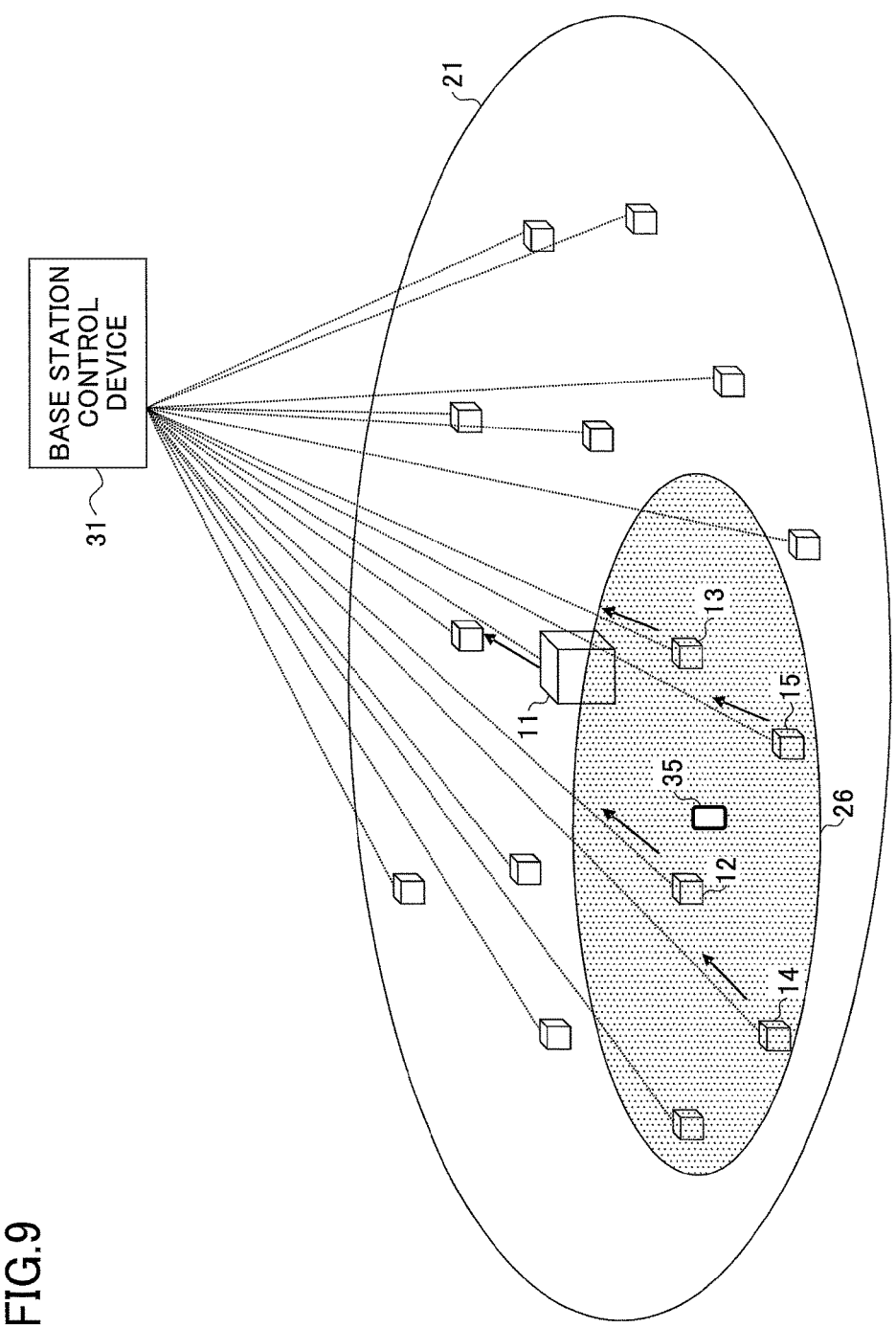
FIG. 9 illustrates how the radio waves for measurement are sent out from the mobile terminal.

Here, in regular operations, the mobile terminal 35 establishes communication with the cell (in this case, the macro cell base station 11) to which RACH has been sent. However, in the present embodiment, after receiving a response by DL-SCH, the mobile terminal 35 sends out a radio wave for measurement used for selecting an optimum small cell for communication, i.e., a specific message for measurement (sequence SQ2). For example, the mobile terminal 35 sends out the radio wave for measurement at the timings of the fourth through seventh frames in the third and fourth subcarriers illustrated in FIG. 2. FIG. 9 illustrates how the radio waves for measurement are sent out from the mobile terminal 35. In FIG. 9, the spread of the radios waves for measurement is indicated by a pearskin part 26.

Each of the small cell base stations 12, 13, 14, 15, measures the quality of the radio wave for measurement, and reports the measurement result to the base station control device 31 (EMS 33 or macro cell base station 11A) (sequence SQ3).

The base station control device 31 compiles and compares the measurement results of the quality of the radio waves reported from the respective small cell base stations, and selects the small cell base station reporting a good radio wave quality of the mobile terminal 35 that is the measurement target (sequence SQ4).

In order to contain the mobile terminal 35 in the selected small cell, the base station control device 31 sends an instruction, to the selected small cell base station, to send radio waves (for example, to the small cell base station 12), and reports, to the mobile terminal 35, information of the small cell base station 12 that is the communication destination, via the macro cell base station 11 (sequence SQ5).

Figure 10:
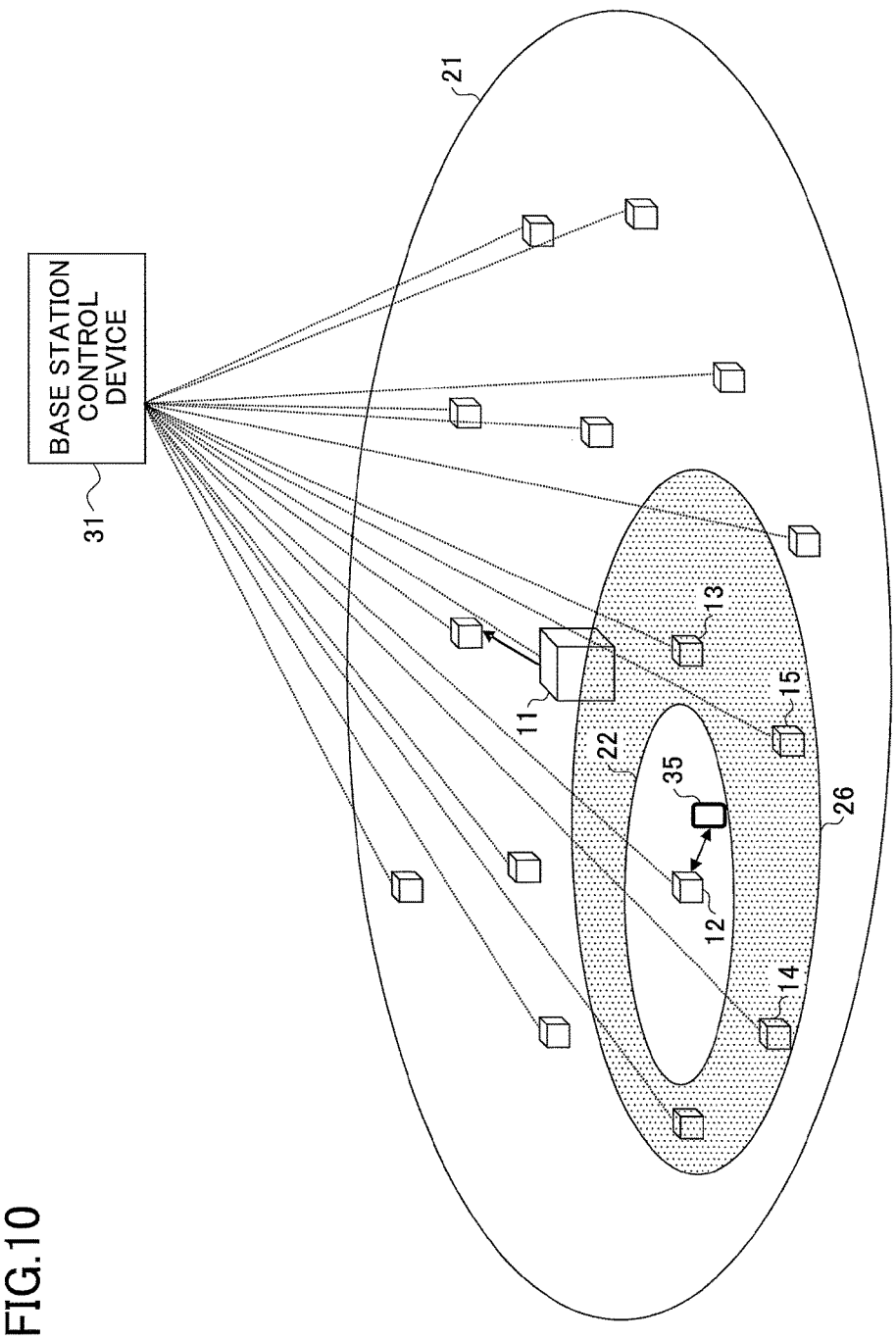
FIG. 10 illustrates a state where the mobile terminal has established communication with the small cell base station.

The mobile terminal 35 issues a RCC (Radio Resource Control) connection request to the small cell base station 12 that has been reported, and performs a process of establishing communication for obtaining a response from the small cell base station (sequence SQ6). Subsequently, the small cell base station 12 connects with the MME 32 of the core network, to be in a communication state. FIG. 10 illustrates a state where the mobile terminal 35 has established communication with the small cell base station 12. In FIG. 10, the spread of the radios waves for measurement from the mobile terminal 35 is indicated by a pearskin part 26, and the cover area 22 of the activated small cell base station 12 is indicated.

<Call Acceptance Operation from Network>

Figure 11:
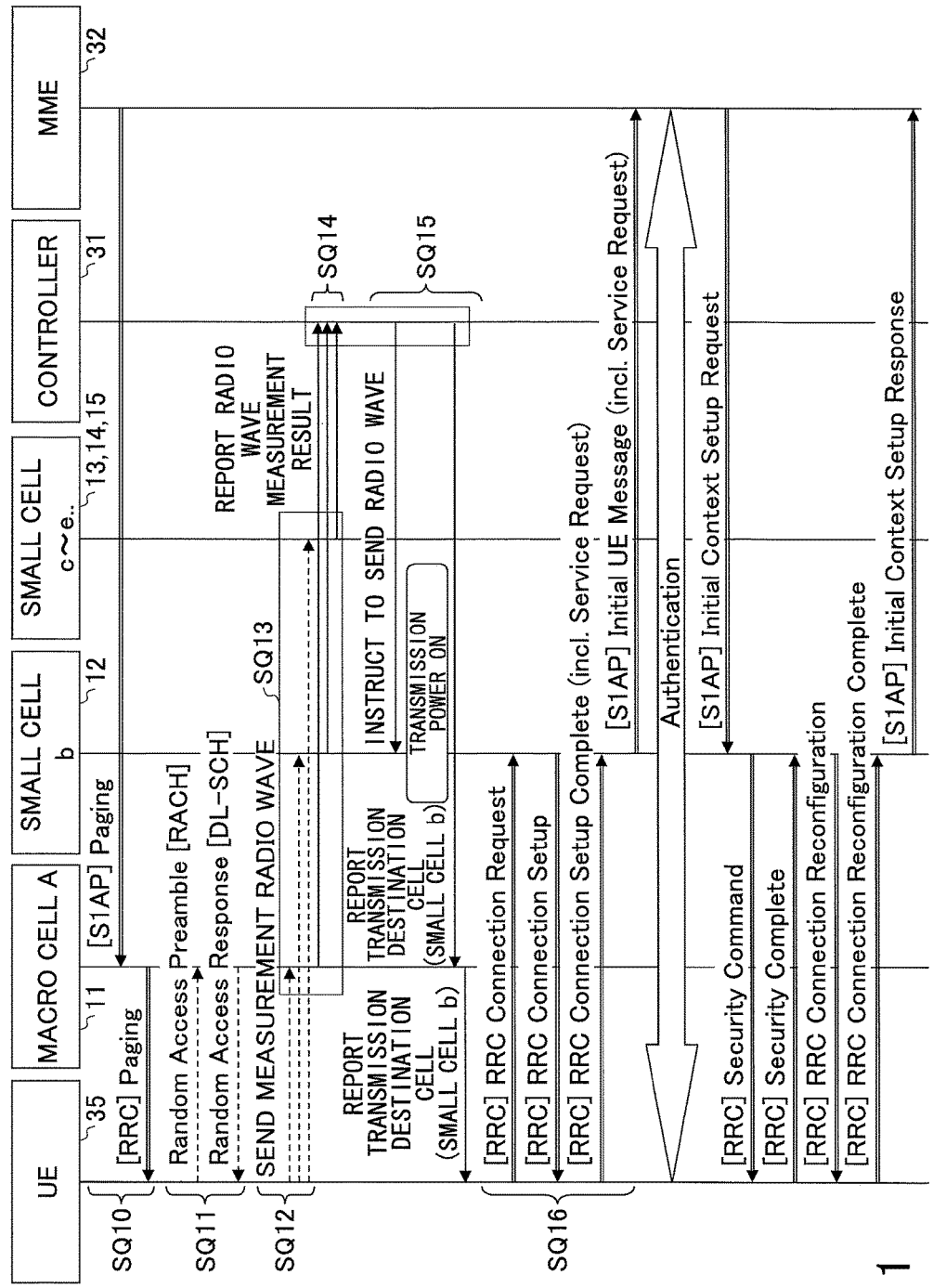
FIG. 11 illustrates the procedures of an embodiment of establishing communication when a call is accepted from a network.

FIG. 11 illustrates the procedures of an embodiment of establishing communication when a call is accepted from a network. In a standby state as illustrated in FIG. 7, the macro cell base station 11 receives a paging made from the MME 32 of the core network to the mobile terminal 35. The macro cell base station 11 sends out a paging message, which is received at the mobile terminal 35 (sequence SQ10).

Accordingly, the mobile terminal 35 accesses the macro cell base station 11 by RACH in a regular manner. The macro cell base station 11 responds to the mobile terminal 35 by DL-SCH if the macro cell base station 11 is in a communicative state (sequence SQ11).

Here, in regular operations, the mobile terminal 35 establishes communication with the cell to which RACH has been sent. However, in the present embodiment, after receiving a response by DL-SCH, the mobile terminal 35 sends out a radio wave for measurement used for selecting an optimum small cell for communication that is to be the actual communication destination (sequence SQ12).

Each of the small cell base stations 12, 13, 14, 15, measures the quality of the radio wave for measurement, and reports the measurement result to the base station control device 31 (EMS 33 or macro cell base station 11A) (sequence SQ13).

The base station control device 31 compiles and compares the measurement results of the quality of the radio waves reported from the respective small cell base stations, and selects the small cell base station reporting a good radio wave quality of the mobile terminal 35 that is the measurement target (sequence SQ14).

In order to enable communication of the selected small cell, the base station control device 31 sends an instruction, to the selected small cell base station, to send radio waves (for example, to the small cell base station 12), and reports, to the mobile terminal 35, information of the small cell base station 12 that is the communication destination, via the macro cell base station 11 (sequence SQ15).

The mobile terminal 35 issues a RCC connection request to the small cell base station 12 that has been reported, and performs a process of establishing communication for obtaining a response from the small cell base station 12 (sequence SQ16). Subsequently, the small cell base station 12 connects with the MME 32 of the core network, to be in a communication state.

<Activation of Surrounding Cell>

In a case where the mobile terminal 35 has activated only the small cell base station 12 with which communication is to be established, when the mobile terminal 35 moves and handover is performed, the only cell at the movement destination would be the macro cell base station 11. For this reason, the small cell base stations surrounding the small cell base station 12 are also activated.

In the adjacent cell information database 63 in the base station control device 31 or the small cell base stations 12A, 13A, 14A, 15A, etc., adjacent cell information of adjacent small cells which may be the target of the handover destination, is set in advance. Based on the adjacent cell information of the small cell with which communication is established, the base station control unit 65 of the base station control device 31 or the macro cell base station 11A makes an instruction to send radio waves, to a small cell adjacent to the small cell with which communication is established.

Figure 12:
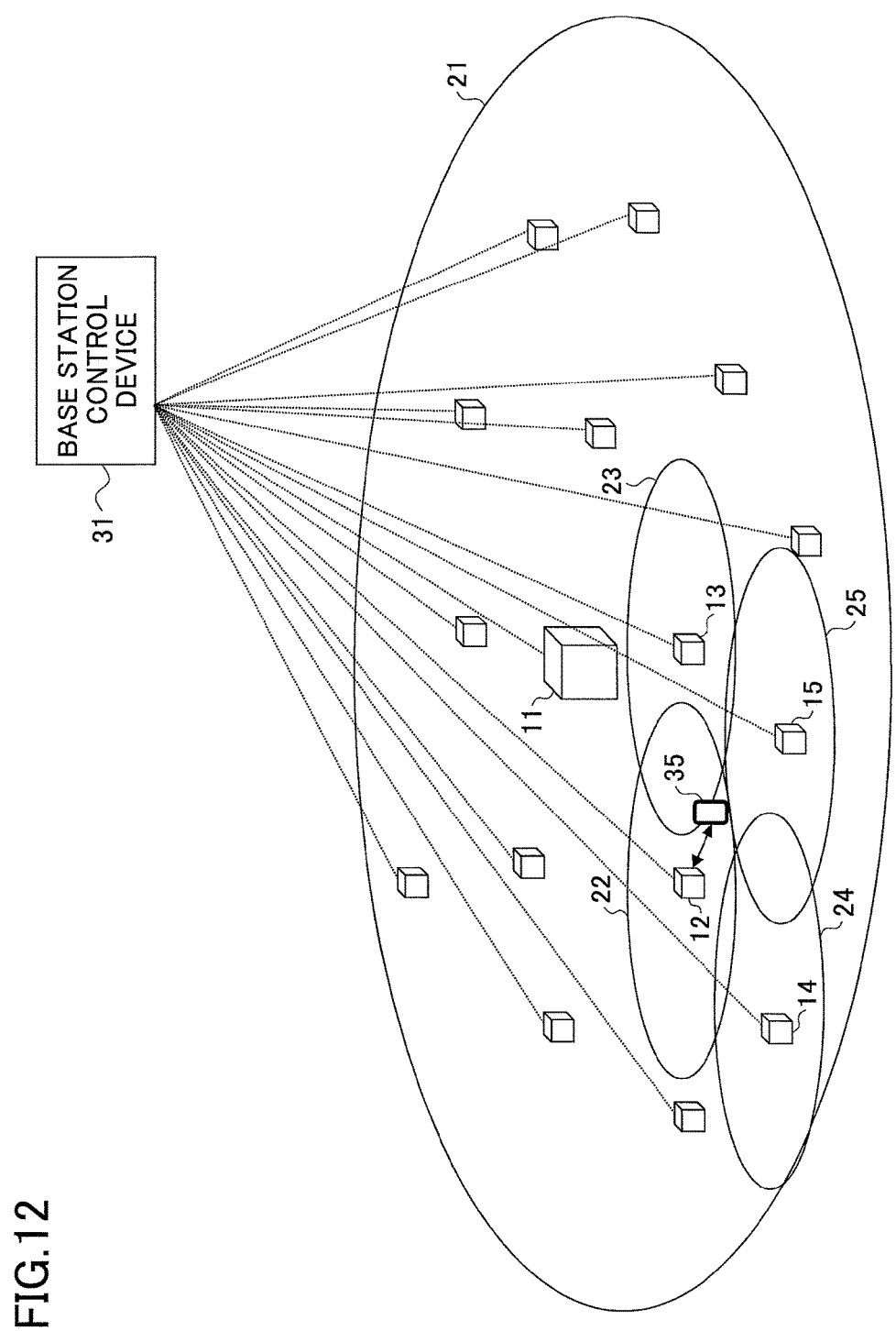
FIG. 12 illustrates a state where the mobile terminal has established communication with the small cell base station, and has activated the adjacent small cell base stations.

Accordingly, the mobile terminal 35 is able to perform seamless handover from the small cell with which the mobile terminal 35 is communicating, to an adjacent small cell. FIG. 12 illustrates a state where the mobile terminal 35 has established communication with the small cell base station 12, and has activated the adjacent small cell base stations 13, 14, 15. In FIG. 12, the cover areas 22, 23, 24, 25, of the activated small cell base stations 12, 13, 14, 15, respectively, are illustrated.

<Call Request Operation from Mobile Terminal (2)>

Figure 13:
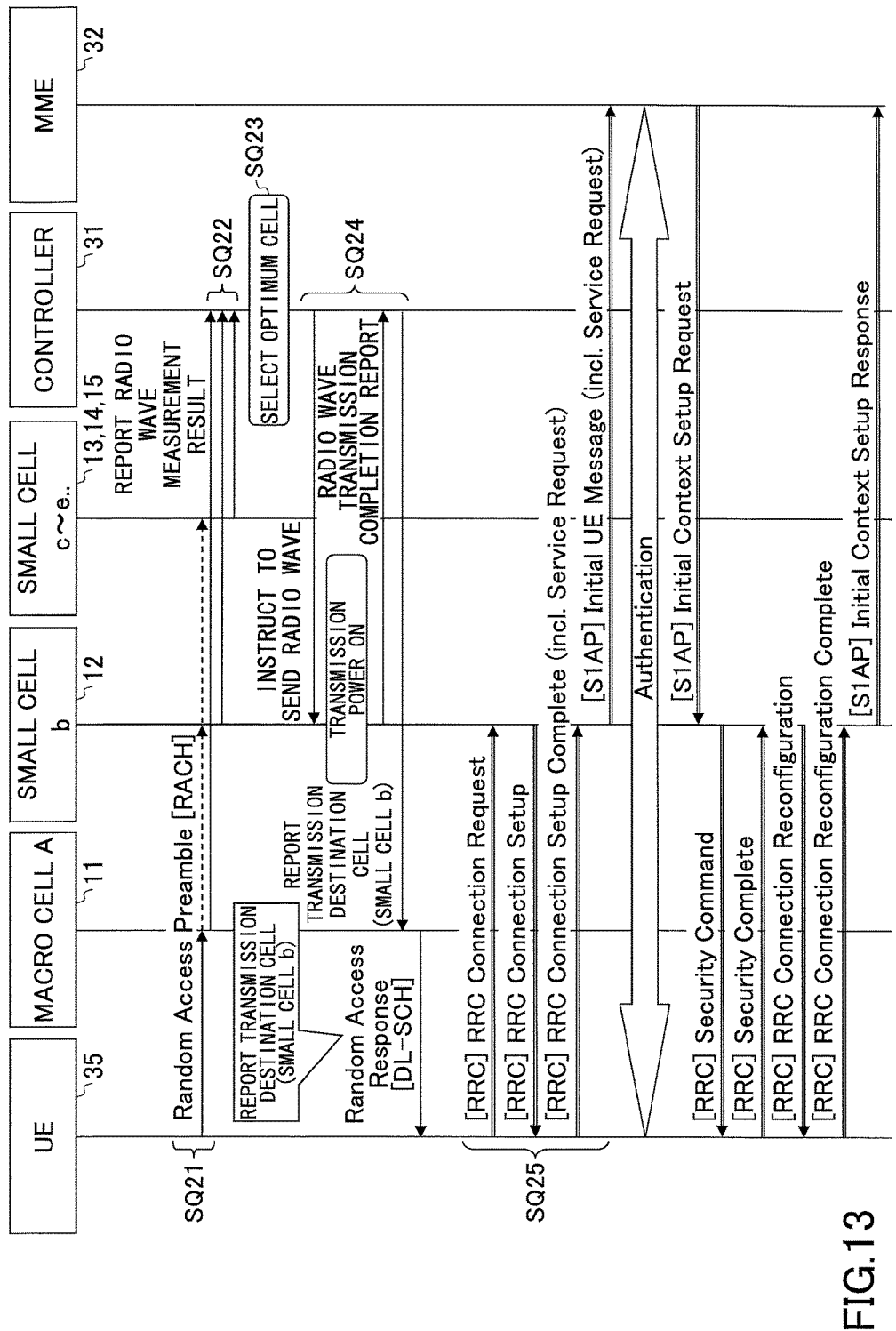
FIG. 13 illustrates the procedures of another embodiment of establishing communication when a call request is made from a mobile terminal.

FIG. 13 illustrates the procedures of another embodiment of establishing communication when a call request is made from a mobile terminal. In a standby state as illustrated in FIG. 7, the mobile terminal 35 accesses the macro cell base station 11 in a regular manner by RACH (sequence SQ21), and each of the small cell base stations 12, 13, 14, 15, measures the quality of the radio wave of RACH, and reports the measurement result to the base station control device 31 (EMS 33 or macro cell base station 11A) (sequence SQ22).

The base station control device 31 compiles and compares the measurement results of the quality of the radio waves reported from the respective small cell base stations, and selects the small cell base station reporting a good radio wave quality of the mobile terminal 35 that is the measurement target (sequence SQ23).

In order to enable communication of the selected small cell, the base station control device 31 sends an instruction, to the selected small cell base station, to send radio waves (for example, to the small cell base station 12), and reports, to the mobile terminal 35, information of the small cell base station 12 that is the communication destination, via the macro cell base station 11 (sequence SQ24).

The mobile terminal 35 issues a RCC connection request to the small cell base station 12 that has been reported, and performs a process of establishing communication for obtaining a response from the small cell base station 12 (sequence SQ25). Subsequently, the small cell base station 12 connects with the MME 32 of the core network, to be in a communication state.

In this embodiment, each of the small cell base stations measures the quality of the radio waves at the timing of RACH, and therefore the sequence is reduced, and the quality of the radio waves is measured in an existing sequence, and therefore there is no need to add a specific message for measurement.

<End of Speech and Release>

When speech between the mobile terminal 35 and an activated particular small cell base station has ended, the mobile terminal 35 first turns into a standby state.

The activated particular small cell base station and adjacent small cell base stations, continue to be in a non-communication state for a certain period, and then stop sending radio waves, and return to a standby state.

<State Transition Diagram of Small Cell Base Station>

Figure 14:
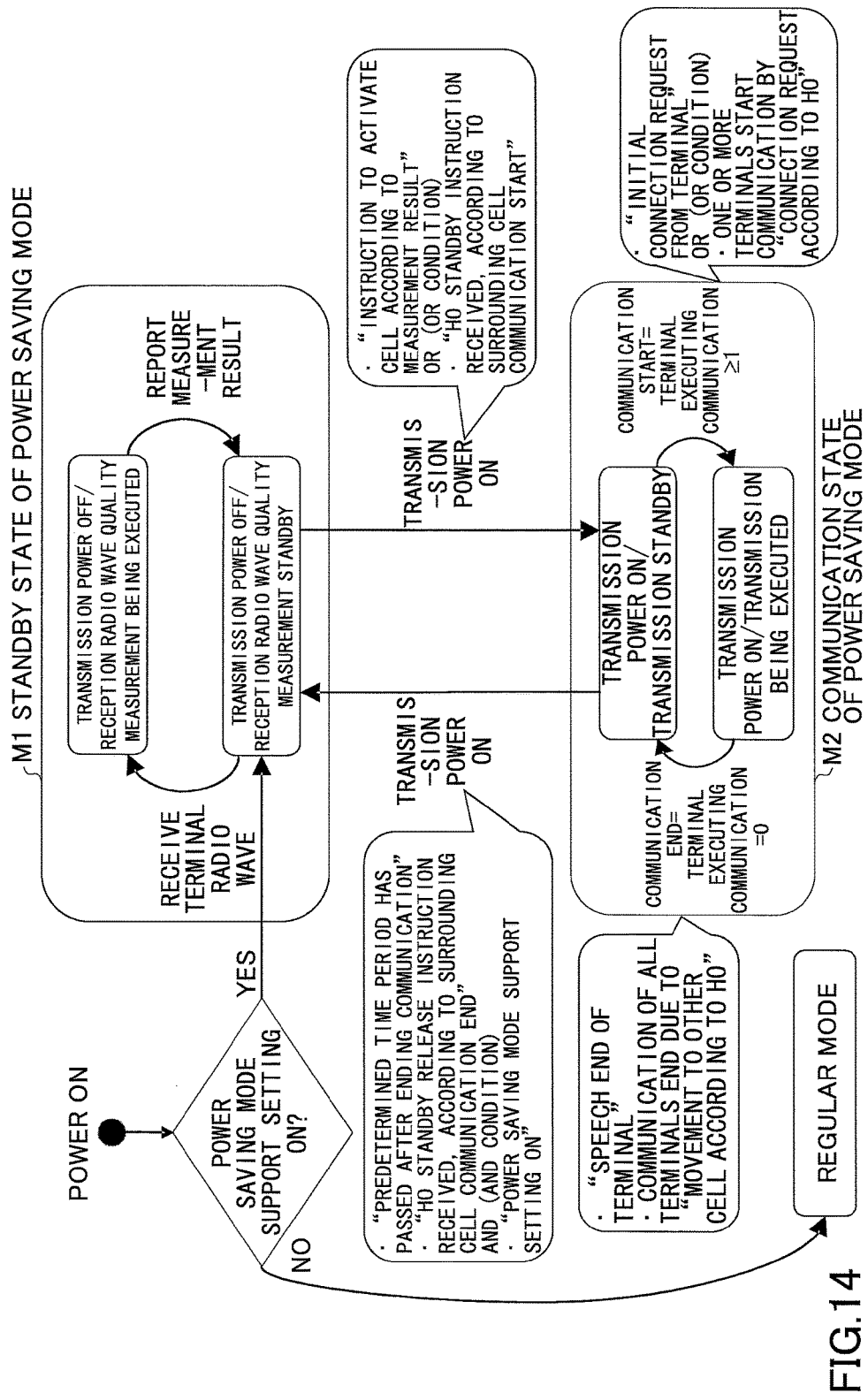
FIG. 14 is a state transition diagram of a small cell base station.

FIG. 14 is a state transition diagram of a small cell base station. Each small cell base station holds a setting for identifying whether to operate in a power saving mode based on a network configuration in which it is arranged, as station data in a register, etc. Accordingly, even when the small cell base station does not operate in a power saving mode, the small cell base station may be arranged by the same configuration.

When the small cell base station is activated, the small cell base station confirms the station data to determine whether the small cell base station supports the power saving mode, and when the setting indicates that the small cell base station supports the power saving mode, the small cell base station is activated in the power saving mode. When the setting indicates that the small cell base station does not support the power saving mode, the small cell base station is activated in a regular mode.

In the power saving mode, when communication is not yet performed, the transmission function is turned off, and only the reception function is turned on, and the small cell base station stands by in a standby state of the power saving mode M1, in which the reception radio wave quality measurement of radio waves from the mobile terminal 35 is effective.

The small cell base station stands by until there is a transition instruction to shift to a communication state, from the base station control device 31. During the standby, the small cell base station measures and reports the radio wave quality according to radio waves received from the mobile terminal 35; however, the small cell base station does not shift to a communication state until there is a transition instruction from the base station control device 31.

According to a transition instruction to shift to a communication state from the base station control device 31, the small cell base station shifts from the standby state in the power saving mode M1 to a communication state in the power saving mode M2. The shift to the communication state in the power saving mode M2 is triggered by two cases, including a case of communicating with the mobile terminal 35 and a case of preparing for handover of the mobile terminal 35.

The shift from the communication state in the power saving mode M2 to the standby state in the power saving mode M1 is performed when the following conditions of logical multiplication are satisfied. The first condition is that a predetermined time (for example, several seconds to several tens of seconds) has passed after ending the communication. The second condition is that a handover standby release instruction has been received, according to the end of communication of an adjacent small cell base station. The third condition is that the power saving mode support setting is on.

When there is at least one mobile terminal executing communication in the cover area of the small cell, the small cell base station does not shift to a standby state. Furthermore, when there is at least one mobile terminal executing communication in the cover area of the small cell, the state shifts from the standby state, to during communication.

<Operations of Small Cell Base Station>

Figure 15:
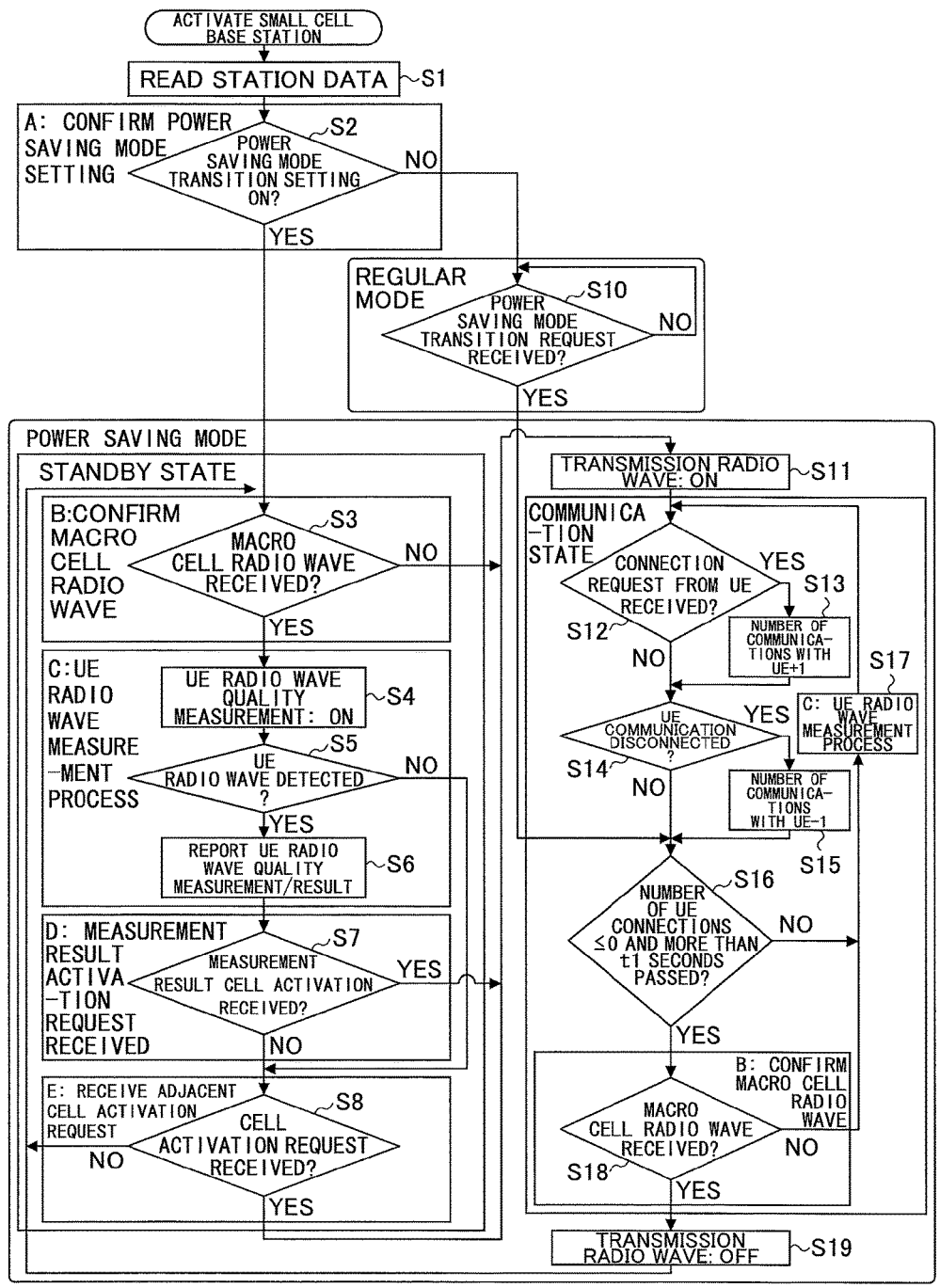
FIG. 15 is a flowchart of an embodiment of operations executed by the small cell base station.

FIG. 15 is a flowchart of an embodiment of operations executed by the small cell base station.

In step S1, when activated, the small cell base station reads a power saving mode setting set in the station data by the user, and in step S2, the small cell base station confirms the power saving mode setting, and when the power saving mode setting is on, the small cell base station shifts to a power saving mode and proceeds to step S3. When the power saving mode is not supported, the small cell base station shifts to a regular mode of performing regular base station operations, and proceeds to step S10. Furthermore, although not illustrated, by receiving control from the EMS 33 at the respective points in the flowchart, the small cell base station may shift from a regular mode to the power saving mode, and shift from the power saving mode to a regular mode.

In step S3, the small cell base station confirms whether radio waves of the macro cell base station 11 are received, and when the radio waves of the macro cell base station 11 are not received, in order to compensate for the cover area of the macro cell base station 11 by the small cell base station, in step S11, the small cell base station activates the transmission amplifier 52, and turns on the transmission radio waves. When the radio waves of the macro cell base station 11 are received, the process proceeds to step S4.

In step S4, the small cell base station performs radio wave quality measurement of radio waves from the mobile terminal 35, and in step S5, the small cell base station determines whether radio waves from the mobile terminal 35 are detected. When radio waves from the mobile terminal 35 are detected, in step S6, the small cell base station reports the measurement result of the radio wave quality measurement of radio waves from the mobile terminal 35, to the reception radio wave quality comparison unit 64 in the EMS 33 or the macro cell base station 11, and the process proceeds to step S7. When radio waves from the mobile terminal 35 are not detected, the process proceeds to step S8.

In step S7, the small cell base station determines whether a measurement result cell activation request to the station itself is received from the base station control unit 65 in the EMS 33 or the macro cell base station 11. The measurement result cell activation request is issued from the base station control unit 65, when a mobile terminal 35 is present in the cover area of the station itself, based on the measurement result of the radio wave quality measurement. When a measurement result cell activation request to the station itself is received, the process proceeds to step S11, and when the measurement result cell activation request to the station itself is not received, the process proceeds to step S8.

In step S8, the small cell base station determines whether an adjacent cell activation request to the station itself is received from the base station control unit 65 in the EMS 33 or the macro cell base station 11. The adjacent cell activation request is issued from the base station control unit 65 when a mobile terminal 35 is present in the cover area of an adjacent station. When an adjacent cell activation request to the station itself is received, the process proceeds to step S11, and when an adjacent cell activation request to the station itself is not received, the process proceeds to step S3.

Incidentally, when the power saving mode setting is off in step S2, the mode is the regular mode, and therefore the process proceeds to step S10. In step S10, the small cell base station determines whether a power saving mode transition request is received from the base station control unit 65 in the EMS 33 or the macro cell base station 11. When a power saving mode transition request is not received, step S10 is repeated, and when a power saving mode transition request is received, the small cell base station shifts to a communication state of the power saving mode, and the process proceeds to step S16.

In step S11, the small cell base station activates the transmission amplifier 52 by the power saving control unit 58, and turns on transmission radio waves. Next, in step S12, the small cell base station determines whether a connection request is received from the mobile terminal 35. When a connection request is received, in step S13, the connection number of mobile terminals is incremented by one, and the process proceeds to step S14, and when a connection request is not received, the process directly proceeds to step S14.

In step S14, the small cell base station determines whether the connection of the mobile terminal 35 connected to the station itself is disconnected. When the connection has been disconnected, in step S15, the connection number of mobile terminals is decremented by one, and the process proceeds to step S16, and when the connection has not been disconnected, the process directly proceeds to step S16.

In step S16, the small cell base station determines whether a predetermined time period t1 seconds has passed, from when the number of connections of mobile terminals has become zero. When a predetermined time period t1 seconds has not passed from when the number of connections has become zero, in step S17, similar to steps S4 through S6, the small cell base station performs radio wave quality measurement of radio waves from the mobile terminal, reports the measurement result of the radio wave quality measurement of radio waves from the mobile terminal to the reception radio wave quality comparison unit 64 in the EMS 33 or the macro cell base station 11, and the process proceeds to step S12. When a predetermined time period t1 seconds has passed from when the number of connections has become zero, the process proceeds to step S18.

In step S18, the small cell base station confirms whether radio waves of the macro cell base station 11 are received. When radio waves of the macro cell base station 11 are not received, in order to compensate for the cover area of the macro cell base station 11 by the small cell base station, the process proceeds to step S17 for the small cell base station to maintain the communication state.

In step S17, the small cell base station performs radio wave quality measurement of radio waves from the mobile terminal, and reports the measurement result of the radio wave quality measurement of radio waves from the mobile terminal to the reception radio wave quality comparison unit 64 in the EMS 33 or the macro cell base station 11, and the process proceeds to step S12.

Meanwhile, when radio waves of the macro cell base station 11 are received, in step S19, the small cell base station stops the driving of the transmission amplifier 52 to turn off the transmission radio waves and shifts to the standby state, and the process proceeds to step S3.

In the present embodiment, radio wave quality measurement of radio waves received from a mobile terminal, is performed in a plurality of small cell base stations, an optimum small cell for containing the mobile terminal is selected based on the radio wave quality measurement result, and the selected small cell is turned into a communication state. In this manner, the mobile terminal is contained in an optimum small cell based on the radio wave quality, and the communication quality is improved. Furthermore, there is no need to provide a position information database for indicating the relationship between the position of the mobile terminal and the cover area of the small cell, and therefore it is possible to suppress the increase of cost.

According to an embodiment of the present invention, it is possible to improve the communication quality.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile communication system of an overlay configuration in which a plurality of small cells are arranged in a macro cell, the mobile communication system comprising:
 a base station of each of the plurality of small cells, communicable with a mobile terminal: and
 a base station control device communicable with the base station, wherein the base station has a first processor programmed to execute a process including
  shifting to a standby state in which transmission power is turned off when the mobile terminal is not contained in a corresponding one of the plurality of small cells, and
  measuring a quality of radio waves received from the mobile terminal that is present in the macro cell, and reporting a measurement result to the base station control device, and
 wherein the base station control device has a second processor programmed to execute a process including
  selecting one of the plurality of small cells in which the mobile terminal is to be contained, based on the measurement result reported from the base station of each of the plurality of small cells, and
  instructing the base station of the selected one of the plurality of small cells to shift to a communication state in which the transmission power is turned on,
 wherein the first processor is programmed to execute the process further including
 shifting from the standby state to a communication state in which the transmission power is turned on when a signal instructing a shift to the communication state is received in response to reporting the measurement result to the base station control device, and
 shifting from the communication state to the standby state, when a predetermined time elapses in a state in which no mobile terminals are contained in the corresponding one of the plurality of small cells, and radio waves are received from a base station of the macro cell.

2. The mobile communication system according to claim 1, wherein
 the second processor is programmed to execute the process further including
  instructing the base station of one of the plurality of small cells adjacent to the selected one of the plurality of small cells, to shift to the communication state in which the transmission power is turned on.

3. The mobile communication system according to claim 2, wherein
 transmission of radio waves from the mobile terminal that is present in the macro cell, and reception of radio waves received at the base stations of the plurality of small cells from the mobile terminal that is present in the macro cell, are performed in synchronization with each other.

4. The mobile communication system according to claim 1, wherein
 the base station control device is provided in a management device in the mobile communication system.

5. The mobile communication system according to claim 1, wherein
 the base station control device is provided in a base station of the macro cell.

6. A power control method executed by a mobile communication system of an overlay configuration in which a plurality of small cells are arranged in a macro cell, wherein
a base station of each of the plurality of small cells executes a process that includes
shifting to a standby state in which transmission power is turned off when a mobile terminal is not contained in a corresponding one of the plurality of small cells, and
measuring, in the standby state, a quality of radio waves received from the mobile terminal that is present in the macro cell, and reporting a measurement result to a base station control device, wherein
the base station control device executes a process that includes
selecting one of the plurality of small cells in which the mobile terminal is to be contained, based on the measurement result reported from the base station of each of the plurality of small cells, and
instructing the base station of the selected one of the plurality of small cells to shift to a communication state in which the transmission power is turned on, wherein
the base station of each of the plurality of small cells executes the process that further includes
shifting from the standby state to communication state in which the transmission power is turned on when a signal instructing a shift to the communication state is received in response to reporting the measurement result to the base station control device, and
shifting from the communication state to the standby state, when a predetermined time elapses in a state in which no mobile terminals are contained in the corresponding one of the plurality of small cells, and radio waves are received from a base station of the macro cell.

7. The power control method according to claim 6, wherein
the base station control device executes the process further including
instructing the base station of one of the plurality of small cells adjacent to the selected one of the plurality of small cells, to shift to the communication state in which the transmission power is turned on.

8. The power control method according to claim 7, further comprising:
performing, in synchronization with each other, transmission of radio waves from the mobile terminal that is present in the macro cell, and reception of radio waves received at the base stations of the plurality of small cells from the mobile terminal that is present in the macro cell.

9. The power control method according to claim 6, wherein the base station control device is provided in a management device in the mobile communication system.

10. The power control method according to claim 6, wherein the base station control device is provided in a base station of the macro cell.

11. A base station of each of a plurality of small cells in a mobile communication system of an overlay configuration in which the plurality of small cells are arranged in a macro cell, the base station comprising:
a processor programmed to execute a process including
shifting to a standby state in which transmission power is turned off when a mobile terminal is not contained in a corresponding one of the plurality of small cells,
measuring, in the standby state, a quality of radio waves received from the mobile terminal that is present in the macro cell, and reporting a measurement result to a base station control device,
shifting from the standby state to a communication state in which the transmission power is turned on when a signal instructing a shift to the communication state is received in response to reporting the measurement result to the base station control device, and
shifting from the communication state to the standby state, when a predetermined time elapses in a state in which no mobile terminals are contained in the corresponding one of the plurality of small cells, and radio waves are received from a base station of the macro cell.

* * * * *